United States Patent
Ebato et al.

(10) Patent No.: US 10,637,077 B2
(45) Date of Patent: *Apr. 28, 2020

(54) FRAME EQUIPPED MEMBRANE ELECTRODE ASSEMBLY AND FUEL CELL

(71) Applicant: HONDA MOTOR CO., LTD., Minato-Ku, Tokyo (JP)

(72) Inventors: Yutaka Ebato, Wako (JP); Kentaro Ishida, Wako (JP); Kenji Sasaki, Wako (JP); Hiroyuki Tanaka, Pontiac, MI (US); Takaaki Shikano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 15/910,810

(22) Filed: Mar. 2, 2018

(65) Prior Publication Data

US 2019/0273269 A1    Sep. 5, 2019

(51) Int. Cl.
*H01M 8/0273*   (2016.01)
*H01M 8/1004*   (2016.01)
*H01M 8/242*    (2016.01)
*H01M 8/1018*   (2016.01)

(52) U.S. Cl.
CPC ....... *H01M 8/0273* (2013.01); *H01M 8/1004* (2013.01); *H01M 8/1018* (2013.01); *H01M 8/242* (2013.01); *H01M 2008/1095* (2013.01); *H01M 2250/20* (2013.01)

(58) Field of Classification Search
CPC .......................... H01M 8/0273; H01M 8/0297
See application file for complete search history.

(56) References Cited

U.S. PATENT DOCUMENTS

| | | | |
|---|---|---|---|
| 8,399,150 B2 | 3/2013 | Miller et al. | |
| 10,381,661 B2 | 8/2019 | Ohmori et al. | |
| 2005/0142397 A1* | 6/2005 | Wakahoi | H01M 4/8605 |
| | | | 429/483 |

(Continued)

FOREIGN PATENT DOCUMENTS

| | | |
|---|---|---|
| DE | 102016212912 A1 | 1/2017 |
| JP | 2013-515348 A | 5/2013 |

(Continued)

OTHER PUBLICATIONS

U.S. Appl. No. 15/910,752, filed Mar. 2, 2018.

(Continued)

*Primary Examiner* — Olatunji A Godo
(74) *Attorney, Agent, or Firm* — Carrier Blackman & Associates, P.C.; William D. Blackman; Joseph P. Carrier

(57) ABSTRACT

A frame equipped membrane electrode assembly includes a membrane electrode assembly and a frame member. The frame member includes a first frame shaped sheet and a second frame shaped sheet. An inner peripheral portion of the first frame shaped sheet is joined to an outer peripheral portion of the membrane electrode assembly. The inner peripheral portion of the first frame shaped sheet is positioned between an outer peripheral portion of an anode and an outer peripheral portion of a cathode. An inner end of the second frame shaped sheet is positioned outside an outer end of the anode over the entire periphery. The outer end of the cathode is positioned outside the inner end of the second frame shaped sheet over the entire periphery.

24 Claims, 5 Drawing Sheets

(56) References Cited

U.S. PATENT DOCUMENTS

| | | | |
|---|---|---|---|
| 2011/0136038 A1 | 6/2011 | Ishida et al. |
| 2011/0151350 A1 | 6/2011 | Iverson et al. |
| 2014/0017590 A1 | 1/2014 | Sugishita et al. |

FOREIGN PATENT DOCUMENTS

| | | | |
|---|---|---|---|
| JP | 2017-079170 A | 4/2017 |
| WO | 2012/137609 A1 | 10/2012 |

OTHER PUBLICATIONS

Office Action and Search Report, both dated Nov. 22, 2019, issued over the corresponding German Patent Application No. 10 2019 202 686.9, with the English translations thereof.

\* cited by examiner

FRAME EQUIPPED MEMBRANE ELECTRODE ASSEMBLY AND FUEL CELL

BACKGROUND OF THE INVENTION

Field of the Invention

The present invention relates to a frame equipped membrane electrode assembly and a fuel cell.

Description of the Related Art

In general, a solid polymer electrolyte fuel cell employs a solid polymer electrolyte membrane. The solid polymer electrolyte membrane is a polymer ion exchange membrane. In the fuel cell, an anode is provided on one surface of the solid polymer electrolyte membrane, and a cathode is provided on the other surface of the solid polymer electrolyte membrane, respectively to form a membrane electrode assembly (MEA).

The membrane electrode assembly is sandwiched between separators (bipolar plates) to form a power generation cell (unit fuel cell). In use, a predetermined number of power generation cells are stacked together to form a fuel cell stack. For example, the fuel cell stack is mounted in a vehicle as an in-vehicle fuel cell stack.

In recent years, in an attempt to reduce the quantity of the relatively expensive solid polymer electrolyte membrane, and protect the thin solid polymer electrolyte membrane having low strength, a frame equipped MEA including a film resin frame member in its outer periphery has been adopted (e.g., see U.S. Pat. No. 8,399,150).

SUMMARY OF THE INVENTION

In the case where the difference between the pressure of a reactant gas supplied to an anode and the pressure of a reactant gas supplied to a cathode is large, when the differential pressure is applied to a thin resin frame member, the resin frame member may be deformed excessively, and the resin frame member may be damaged undesirably.

The present invention has been made taking the above problem into account, and an object of the present invention is to provide a resin frame equipped membrane electrode assembly and a fuel cell in which it is possible to suppress deformation of a frame member in the presence of the difference between the pressure of a reactant gas supplied to an anode and the pressure of a reactant gas supplied to a cathode, and improve the durability of the frame member.

In order to achieve the above object, the present invention provides a frame equipped membrane electrode assembly. The frame equipped membrane electrode assembly includes a membrane electrode assembly and a frame member. The membrane electrode assembly includes an electrolyte membrane, a first electrode provided on one surface of the electrolyte membrane, and a second electrode provided on another surface of the electrolyte membrane. The frame member is provided over the entire periphery of an outer peripheral portion of the membrane electrode assembly. A surface size of the second electrode is larger than a surface size of the first electrode. The frame member includes a first frame shaped sheet and a second frame shaped sheet. An inner peripheral portion of the first frame shaped sheet is joined to the outer peripheral portion of the membrane electrode assembly. The first frame shaped sheet and the second frame shaped sheet are joined together in a thickness direction. The inner peripheral portion of the first frame shaped sheet is disposed between an outer peripheral portion of the first electrode and an outer peripheral portion of the second electrode. An inner end of the second frame shaped sheet is positioned outside an outer end of the first electrode over the entire periphery, and an outer end of the second electrode is positioned outside the inner end of the second frame shaped sheet over the entire periphery.

In the frame equipped membrane electrode assembly according to the present invention, the outer end of the second electrode which is the larger electrode is positioned outside the inner end of the second frame shaped sheet which is the thinner frame shaped sheet, over the entire periphery. In the structure, a portion of the first frame shaped sheet corresponding to a position between the outer end of the first electrode and the inner end of the second frame shaped sheet is supported by the outer peripheral portion of the second electrode. In the structure, in the case where the pressure of the reactant gas applied from the first electrode is higher than the pressure of the reactant gas applied from the second electrode, it is possible to suppress deformation of the frame member in the presence of the differential pressure applied from the first electrode, and improve the durability of the frame member.

Preferably, the inner peripheral portion of the first frame shaped sheet is joined to a surface of an outer peripheral portion of the electrolyte membrane adjacent to the first electrode.

Preferably, an outer end of the electrolyte membrane is positioned outside the outer end of the first electrode.

Preferably, an adhesive layer is provided on the one entire surface of the first frame shaped sheet, an outer peripheral portion of the first frame shaped sheet is joined to the one entire surface of the second frame shaped sheet by the adhesive layer, and the inner peripheral portion of the first frame shaped sheet is joined to the outer peripheral portion of the electrolyte membrane by the adhesive layer.

Preferably, the outer peripheral portion of the second electrode covers a step formed by one surface of the first frame shaped sheet and the inner end of the second frame shaped sheet, and extends outward beyond the inner end of the second frame shaped sheet.

Preferably, the first electrode includes a step at a position corresponding to an inner end of the first frame shaped sheet, and the second electrode includes a step at a position corresponding to the inner end of the second frame shaped sheet.

Preferably, the first electrode is an anode, and the second electrode is a cathode.

Preferably, the inner peripheral portion of the first frame shaped sheet is joined to a surface of an outer peripheral portion of the electrolyte membrane adjacent to the second electrode.

Preferably, an outer end of the electrolyte membrane and the outer end of the first electrode are provided at a same position as viewed in a thickness direction of the electrolyte membrane.

Preferably, an adhesive layer is provided on the one entire surface of the first frame shaped sheet, an outer peripheral portion of the first frame shaped sheet is joined to the one entire surface of the second frame shaped sheet by the adhesive layer, and the inner peripheral portion of the first frame shaped sheet is joined to the outer peripheral portion of the electrolyte membrane by the adhesive layer.

Preferably, a gap is formed between the outer end of the first electrode and the inner end of the second frame shaped sheet.

Preferably, the first electrode is an anode, and the second electrode is a cathode.

Preferably, the inner peripheral portion of the first frame shaped sheet is joined to a surface of an outer peripheral portion of the electrolyte membrane adjacent to the first electrode, on a surface opposite to the second frame shaped sheet.

Preferably, an outer end of the electrolyte membrane and the outer end of the second electrode are at a same position as viewed in a thickness direction of the membrane electrode assembly.

Preferably, an outer peripheral portion of the first frame shaped sheet is joined to the one entire surface of the second frame shaped sheet by a first adhesive layer provided on one surface of the first frame shaped sheet, and the inner peripheral portion of the first frame shaped sheet is joined to the outer peripheral portion of the electrolyte membrane by a second adhesive layer provided on another surface of the first frame shaped sheet.

Preferably, a gap is formed between the outer end of the first electrode and the inner end of the second frame shaped sheet over the entire periphery.

Preferably, the first electrode is an anode, and the second electrode is a cathode.

Further, the present invention provides a fuel cell including a frame equipped membrane electrode assembly and separators provided on both sides of the frame equipped membrane electrode assembly, respectively. The frame equipped membrane electrode assembly includes a membrane electrode assembly and a frame member provided over the entire periphery of an outer peripheral portion of the membrane electrode assembly. The membrane electrode assembly includes an electrolyte membrane, a first electrode provided on one surface of the electrolyte membrane, and a second electrode provided on another surface of the electrolyte membrane. A surface size of the second electrode is larger than a surface size of the first electrode. The frame member includes a first frame shaped sheet and a second frame shaped sheet, an inner peripheral portion of the first frame shaped sheet is joined to the outer peripheral portion of the membrane electrode assembly, the first frame shaped sheet and the second frame shaped sheet are joined together in a thickness direction, the inner peripheral portion of the first frame shaped sheet is disposed between an outer peripheral portion of the first electrode and an outer peripheral portion of the second electrode, an inner end of the second frame shaped sheet is positioned outside an outer end of the first electrode and an inner end of the first frame shaped sheet over the entire periphery, and an outer end of the second electrode is positioned outside the inner end of the second frame shaped sheet over the entire periphery.

Preferably, a bead seal is formed integrally with each of the separators to protrude toward the frame member in order to prevent leakage of a reactant gas, and an overlap area of the frame member where the first frame shaped sheet and the second frame shaped sheet are overlapped together is held between the bead seal of one of the separators and the bead seal of another of the separators from both sides in a thickness direction.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

First Embodiment

Figure 1:
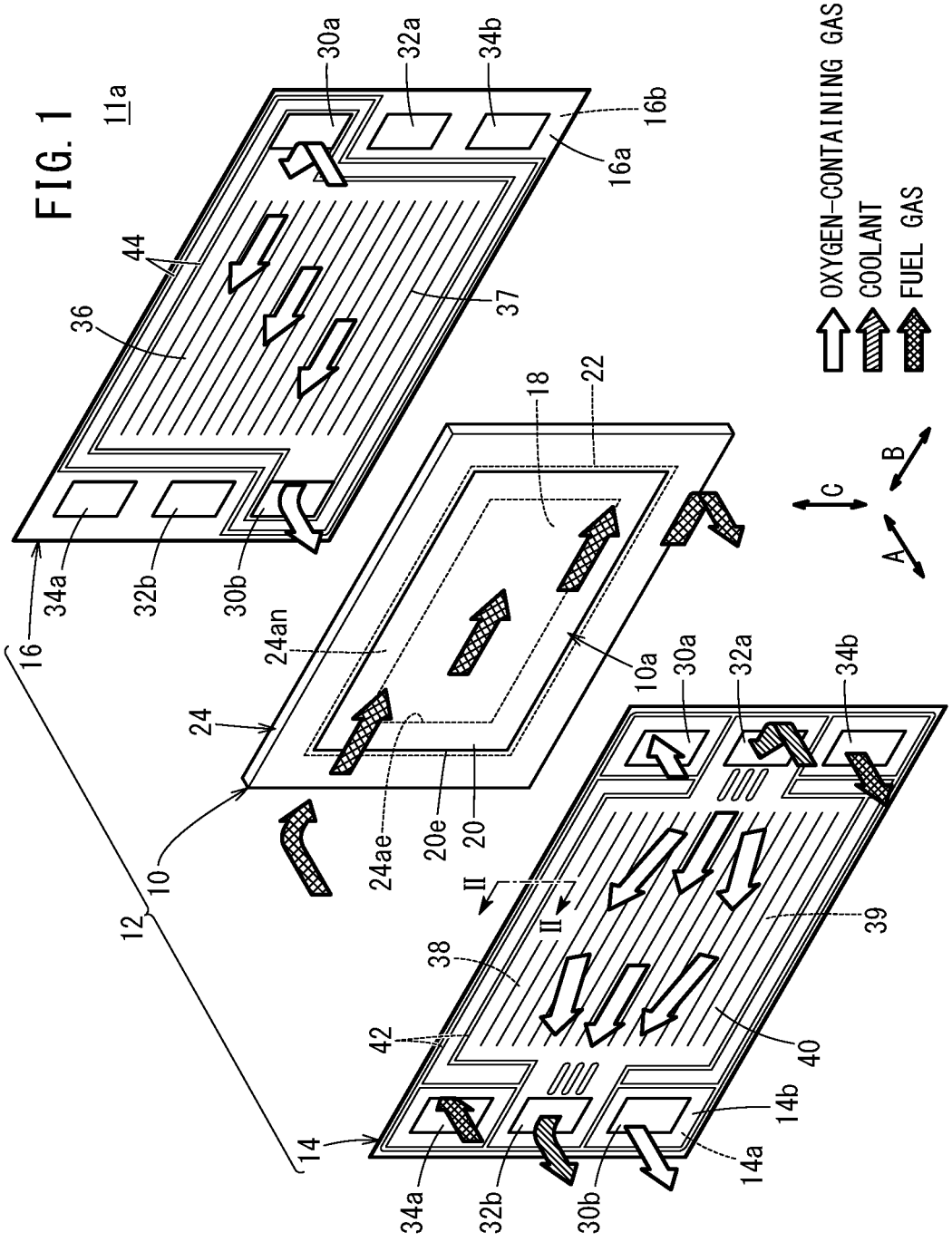
FIG. 1 is an exploded perspective view showing main components of a power generation cell according to a first embodiment of the present invention.
Figure 2:
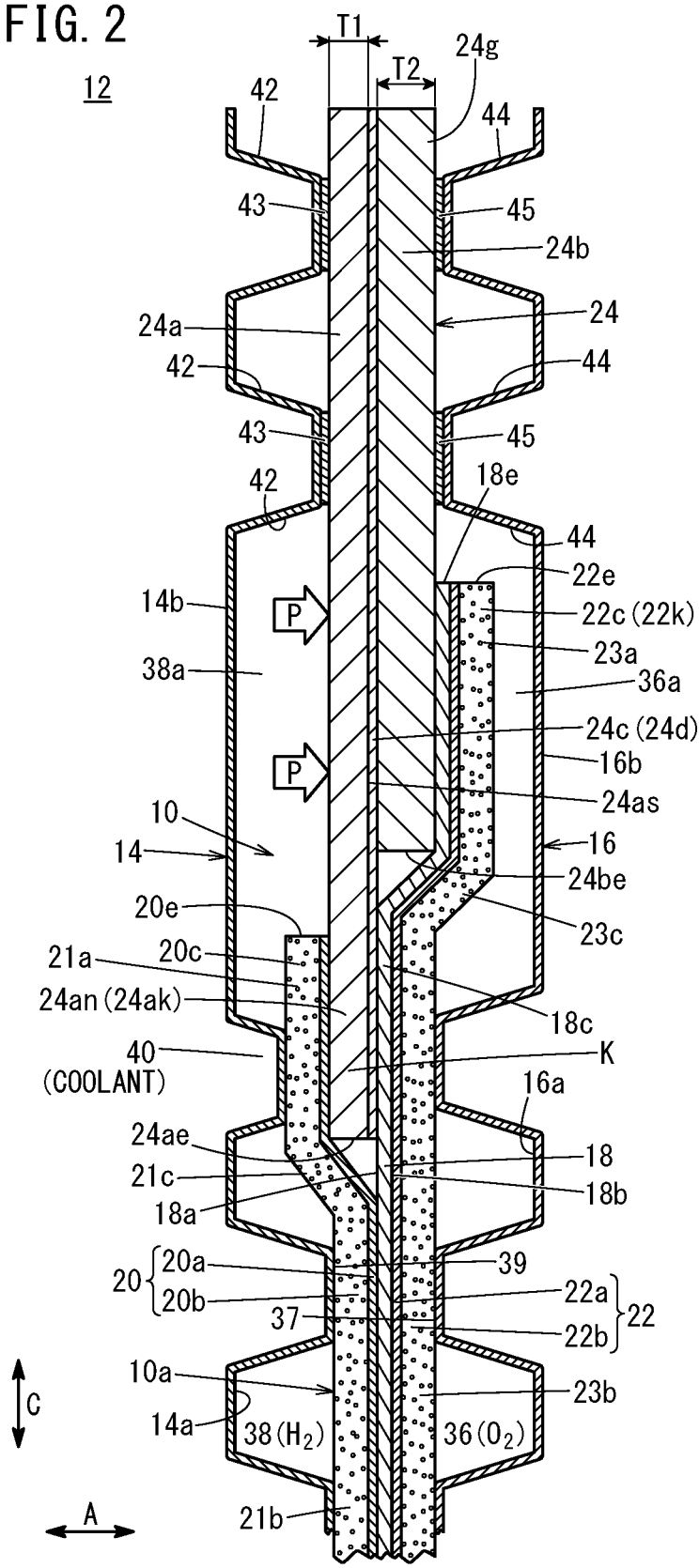
FIG. 2 is a cross sectional view showing the power generation cell taken along a line II-II in FIG. 1.

As shown in FIGS. 1 and 2, a power generation cell (fuel cell) 12 according to a first embodiment includes a frame equipped membrane electrode assembly 10 (hereinafter referred to as the "frame equipped MEA 10"), and a first separator 14 and a second separator 16 provided on both sides of the frame equipped MEA 10, respectively. For example, the power generation cell 12 is a laterally elongated (or longitudinally elongated) rectangular solid polymer electrolyte fuel cell. A plurality of the power generation cells 12 are stacked together in a horizontal direction indicated by an arrow A or in a gravity direction indicated by an arrow C to form a fuel cell stack 11a. For example, the fuel cell stack 11a is mounted as an in-vehicle fuel cell stack, in a fuel cell electric automobile (not shown).

In the power generation cell 12, the frame equipped MEA 10 is sandwiched between the first separator 14 and the second separator 16. Each of the first separator 14 and the second separator 16 has a laterally elongated (or longitudinally elongated) rectangular shape. For example, each of the first separator 14 and the second separator 16 is a steel plate, a stainless steel plate, an aluminum plate, a plate steel plate, a metal plate having an anti-corrosive surface by surface treatment, a carbon member, or the like.

The rectangular frame equipped MEA 10 includes a membrane electrode assembly 10a (hereinafter referred to as the "MEA 10a"). The MEA 10a includes an electrolyte membrane 18, an anode 20 provided on one surface of the electrolyte membrane 18, and a cathode 22 provided on another surface of the electrolyte membrane 18. In the first embodiment, the anode 20 is referred to as the "first electrode" of the present invention, and the cathode 22 is referred to as the "second electrode" of the present invention.

For example, the electrolyte membrane 18 is a solid polymer electrolyte membrane (cation ion exchange membrane). The solid polymer electrolyte membrane is formed by impregnating a thin membrane of perfluorosulfonic acid with water, for example. The electrolyte membrane 18 is interposed between the anode 20 and the cathode 22. A fluorine based electrolyte may be used as the electrolyte membrane 18. Alternatively, an HC (hydrocarbon) based electrolyte may be used as the electrolyte membrane 18. An outer end 18e of the electrolyte membrane 18 is positioned outside an outer end 20e of the anode 20.

The surface size (outer size) of the anode 20 is smaller than the surface sizes of the electrolyte membrane 18 and the cathode 22. Therefore, the outer end of the anode 20 is positioned inside the outer end 18e of the electrolyte membrane 18 and an outer end 22e of the cathode 22, over the entire periphery.

As shown in FIG. 2, the anode 20 includes a first electrode catalyst layer 20a joined to one surface 18a of the electrolyte membrane 18 and a first gas diffusion layer 20b stacked on the first electrode catalyst layer 20a. The surface size of the first electrode catalyst layer 20a and the surface size of the first gas diffusion layer 20b are the same, and smaller than the surface sizes of the electrolyte membrane 18 and the cathode 22.

The surface size of the cathode 22 is larger than the surface sizes of the electrolyte membrane 18 and the anode 20. The outer end 22e of the cathode 22 is positioned outside the outer end 20e of the anode 20 over the entire periphery.

The cathode 22 includes a second electrode catalyst layer 22a joined to a surface 18b of the electrolyte membrane 18 and a second gas diffusion layer 22b stacked on the second electrode catalyst layer 22a. The surface size of the second electrode catalyst layer 22a, the surface size of the second gas diffusion layer 22b, and the surface size of the electrolyte membrane 18 are the same. It should be noted that the surface sizes of the second electrode catalyst layer 22a and the second gas diffusion layer 22b may be larger than the surface size of the electrolyte membrane 18.

For example, the first electrode catalyst layer 20a is formed by porous carbon particles deposited uniformly on the surface of the first gas diffusion layer 20b together with an ion conductive polymer binder, and platinum alloy supported on the porous carbon particles. For example, the second electrode catalyst layer 22a is formed by porous carbon particles deposited uniformly on the surface of the second gas diffusion layer 22b together with an ion conductive polymer binder, and platinum alloy supported on the porous carbon particles.

Each of the first gas diffusion layer 20b and the second gas diffusion layer 22b comprises a carbon paper or a carbon cloth, etc. The surface size of the second gas diffusion layer 22b is larger than the surface size of the first gas diffusion layer 20b. The first electrode catalyst layer 20a and the second electrode catalyst layer 22a are formed on both surfaces of the electrolyte membrane 18, respectively.

The frame equipped MEA 10 is formed around the entire outer periphery of the electrolyte membrane 18, and includes a rectangular frame member 24 joined to the anode 20 and the cathode 22. The frame member 24 includes two frame shaped sheets. Specifically, the frame member 24 includes a first frame shaped sheet 24a and a second frame shaped sheet 24b. The first frame shaped sheet 24a includes an inner peripheral portion 24an joined to an outer peripheral portion of the MEA 10a. The second frame shaped sheet 24b is joined to the first frame shaped sheet 24a.

The first frame shaped sheet 24a and the second frame shaped sheet 24b are joined together over the entire periphery (over the entire surface of the second frame shaped sheet 24b adjacent to the first frame shaped sheet 24a) by an adhesive layer 24c made of adhesive 24d. The second frame shaped sheet 24b is joined to the outer peripheral portion of the first frame shaped sheet 24a. In the structure, an outer peripheral portion 24g of the frame member 24 is thicker than the inner peripheral portion of the frame member 24 (inner peripheral portion 24an of the first frame shaped sheet 24a).

The first frame shaped sheet 24a and the second frame shaped sheet 24b are made of resin material. Examples of materials of the first frame shaped sheet 24a and the second frame shaped sheet 24b include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The inner peripheral portion 24an of the first frame shaped sheet 24a is disposed between an outer peripheral portion 20c of the anode 20 and an outer peripheral portion 22c of the cathode 22 in a thickness direction of the MEA 10a, as shown. Specifically, the inner peripheral portion 24an of the first frame shaped sheet 24a is interposed between an outer peripheral portion 18c of the electrolyte membrane 18 and the outer peripheral portion 20c of the anode 20. The inner peripheral portion 24an of the first frame shaped sheet 24a is joined to the surface 18a of the electrolyte membrane 18 facing the anode 20. The inner peripheral portion 24an of the first frame shaped sheet 24a and the outer peripheral portion 18c of the electrolyte membrane 18 are joined together through the adhesive layer 24c. The inner peripheral portion 24an of the first frame shaped sheet 24a includes an overlap part 24ak overlapped with the outer peripheral portion 20c of the anode 20 over the entire periphery as viewed in the thickness direction of the MEA 10a. The inner peripheral portion 24an of the first frame shaped sheet 24a may be interposed between the electrolyte membrane 18 and the cathode 22 in the state where the adhesive layer 24c is joined to the surface 18b of the electrolyte membrane 18.

A step is provided for the anode 20 at a position corresponding to an inner end 24ae of the first frame shaped sheet 24a. Specifically, the anode 20 has an inclined area 21c inclined from the electrolyte membrane 18, between an area 21a overlapped with the inner peripheral portion 24an of the first frame shaped sheet 24a and an area 21b overlapped with the electrolyte membrane 18. Therefore, in the inclined area 21c, the first electrode catalyst layer 20a and the first gas diffusion layer 20b are inclined from the electrolyte membrane 18.

In the anode 20, the surface of the area 21a overlapped with the inner peripheral portion 24an of the first frame shaped sheet 24a, adjacent to the first separator 14 is spaced from the electrolyte membrane 18, in comparison with the surface of the area 21b overlapped with the electrolyte membrane 18, adjacent to the first separator 14.

A step is provided for the cathode 22 at a position corresponding to an inner end 24be of the second frame shaped sheet 24b. Specifically, the cathode 22 has an inclined area 23c inclined from the first frame shaped sheet 24a, between an area 23a overlapped with the inner peripheral portion of the second frame shaped sheet 24b and an area 23b overlapped with the outer peripheral portion of the electrolyte membrane 18. Therefore, in the inclined area 23c, the second electrode catalyst layer 22a and the second gas diffusion layer 22b are inclined from the electrolyte membrane 18. The outer peripheral portion 22c of the cathode 22 covers the step formed by one surface (surface 24as) of the first frame shaped sheet 24a and the inner end 24be of the second frame shaped sheet 24b, and extends outward beyond the inner end 24be of the second frame shaped sheet 24b. In the cathode 22, the surface of the area 23a overlapped with the inner peripheral portion of the second frame shaped sheet 24b, adjacent to the second separator 16 is spaced from the first frame shaped sheet 24a, in comparison with the surface of the area 23*b* overlapped with the electrolyte membrane 18, adjacent to the second separator 16.

The cathode 22 also may have an inclined area at a position corresponding to the inclined area 21*c* of the anode 20. That is, the cathode 22 may have an inclined area inclined from the electrolyte membrane 18 between an area overlapped with the inner peripheral portion 24*an* of the first frame shaped sheet 24*a* and an area overlapped with the electrolyte membrane 18 (area inclined in a direction opposite to the inclined area 21*c*).

Instead of adopting the above structure, the anode 20 may have a flat shape from the area 21*b* overlapped with the electrolyte membrane 18 to the area 21*a* overlapped with the inner peripheral portion 24*an* of the first frame shaped sheet 24*a*, and the cathode 22 may have an inclined area inclined from the electrolyte membrane 18, between the area 23*b* overlapped with the electrolyte membrane 18 and the area 23*a* overlapped with the inner peripheral portion 24*an* of the first frame shaped sheet 24*a*.

The second frame shaped sheet 24*b* is joined to the outer peripheral portion of the first frame shaped sheet 24*a*. The thickness T2 of the second frame shaped sheet 24*b* is larger than the thickness T1 of the first frame shaped sheet 24*a*. It should be noted that the thickness of the first frame shaped sheet 24*a* and the second frame shaped sheet 24*b* may be the same. The inner end 24*be* of the second frame shaped sheet 24*b* is positioned outside the inner end 24*ae* of the first frame shaped sheet 24*a* (in a direction away from the MEA 10*a*) over the entire periphery.

The inner end 24*be* of the second frame shaped sheet 24*b* is positioned outside the outer end 20*e* of the anode 20, and outside the inner end 24*ae* of the first frame shaped sheet 24*a*, over the entire periphery. The inner end 24*be* of the second frame shaped sheet 24*b* is positioned inside the outer end 18*e* of the electrolyte membrane 18. The inner end 24*be* of the second frame shaped sheet 24*b* may be positioned outside the outer end 18*e* of the electrolyte membrane 18. The outer end 22*e* of the cathode 22 is positioned outside the inner end 24*be* of the second frame shaped sheet 24*b*, over the entire periphery. Therefore, as viewed in the thickness direction of the MEA 10*a*, the outer peripheral portion 22*c* of the cathode 22 has an overlap part 22*k* overlapped with the inner peripheral portion of the second frame shaped sheet 24*b*.

The adhesive layer 24*c* is provided over the entire surface 24*as* of the first frame shaped sheet 24*a* adjacent to the second frame shaped sheet 24*b* (cathode side). The outer peripheral portion of the first frame shaped sheet 24*a* is joined to the one entire surface of the second frame shaped sheet 24*b* by the adhesive layer 24*c*. The inner peripheral portion 24*an* of the first frame shaped sheet 24*a* is joined to the outer peripheral portion 18*c* of the electrolyte membrane 18 by the adhesive layer 24*c*. As the adhesive 24*d* of the adhesive layer 24*c*, for example, liquid adhesive or a hot melt sheet is provided. The adhesive is not limited to liquid or solid adhesive, and not limited to thermoplastic or thermosetting adhesive, etc.

An overlap part K where the anode 20, the first frame shaped sheet 24*a*, and the cathode 22 are overlapped together is held between a ridge 39 of the first separator 14 protruding toward the anode 20 and a ridge 37 of the second separator 16 protruding toward the cathode 22. The overlap part K may be held between a bead seal provided for the first separator 14 and a bead seal provided for the second separator 16.

As shown in FIG. 1, at one end of the power generation cell 12 in the horizontal direction indicated by the arrow B, an oxygen-containing gas supply passage 30*a*, a coolant supply passage 32*a*, and a fuel gas discharge passage 34*b* are provided. The oxygen-containing gas supply passage 30*a*, the coolant supply passage 32*a*, and the fuel gas discharge passage 34*b* extend through the power generation cell 12 in the stacking direction indicated by the arrow A. The oxygen-containing gas is supplied through the oxygen-containing gas supply passage 30*a*, and the coolant is supplied through the coolant supply passage 32*a*. A fuel gas such as a hydrogen-containing gas is discharged through the fuel gas discharge passage 34*b*. The oxygen-containing gas supply passage 30*a*, the coolant supply passage 32*a*, and the fuel gas discharge passage 34*b* are arranged in the vertical direction indicated by the arrow C.

At another end of the power generation cell 12 in the direction indicated by the arrow B, a fuel gas supply passage 34*a* for supplying the fuel gas, a coolant discharge passage 32*b* for discharging the coolant, and an oxygen-containing gas discharge passage 30*b* for discharging the oxygen-containing gas are provided. The fuel gas supply passage 34*a*, the coolant discharge passage 32*b*, and the oxygen-containing gas discharge passage 30*b* extend through the power generation cell 12 in the direction indicated by the arrow A. The fuel gas supply passage 34*a*, the coolant discharge passage 32*b*, and the oxygen-containing gas discharge passage 30*b* are arranged in the direction indicated by the arrow C.

The first separator 14 has a fuel gas flow field 38 on its surface 14*a* facing the frame equipped MEA 10. The fuel gas flow field 38 is connected to the fuel gas supply passage 34*a* and the fuel gas discharge passage 34*b*. Specifically, the fuel gas flow field 38 is formed between the first separator 14 and the frame equipped MEA 10. The fuel gas flow field 38 includes straight flow grooves (or wavy flow grooves) extending in the direction indicated by the arrow B.

The second separator 16 has an oxygen-containing gas flow field 36 on its surface 16*a* facing the frame equipped MEA 10. The oxygen-containing gas flow field 36 is connected to the oxygen-containing gas supply passage 30*a* and the oxygen-containing gas discharge passage 30*b*. Specifically, the oxygen-containing gas flow field 36 is formed between the second separator 16 and the frame equipped MEA 10. The oxygen-containing gas flow field 36 includes a plurality of straight flow grooves (or wavy flow grooves) extending in the direction indicated by the arrow B.

A coolant flow field 40 is formed between a surface 14*b* of the first separator 14 and a surface 16*b* of the second separator 16. The coolant flow field 40 is connected to the coolant supply passage 32*a* and the coolant discharge passage 32*b*. The coolant flow field 40 extends in the direction indicated by the arrow B.

As shown in FIG. 2, a plurality of the ridges 39 forming the fuel gas flow field 38 are provided on the surface 14*a* of the first separator 14 (surface facing the frame equipped MEA 10). The ridges 39 protrude toward the anode 20, and contact the anode 20. A plurality of the ridges 37 forming the oxygen-containing gas flow field 36 are provided on the surface 16*a* of the second separator 16 (surface facing the frame equipped MEA 10). The ridges 37 protrude toward the cathode 22, and contact the cathode 22. The MEA 10*a* is held between the ridges 37, 39.

A plurality of bead seals 42 are provided on the surface 14*a* of the first separator 14 around the outer peripheral portion of the first separator 14, for preventing leakage of the fuel gas to the outside. The bead seals 42 are formed to expand toward the frame member 24 by press forming. The bead seal 42 on the inner side is formed around the fuel gas flow field 38, the fuel gas supply passage 34a, and the fuel gas discharge passage 34b, while allowing the fuel gas flow field 38 to be connected to the fuel gas supply passage 34a and the fuel gas discharge passage 34b. Though the two bead seals 42 are provided in the embodiment, only one bead seal 42 may be provided.

A resin member 43 (or rubber member) is adhered to the front end surface of the ridge of each of the bead seals 42 by printing, coating, etc. The bead seals 42 contact the first frame shaped sheet 24a (an area overlapped with the second frame shaped sheet 24b) in an air tight or liquid tight manner through the resin member 43. The resin member 43 may be adhered to the first frame shaped sheet 24a.

Instead of the bead seals 42, elastic solid seals protruding toward the frame member 24 may be provided for the first separator 14.

A channel 38a formed between the first separator 14 and the frame member 24 inside the bead seals 42 (MEA 10a side) is connected to the fuel gas flow field 38. Therefore, the fuel gas is supplied to the channel 38a.

Bead seals 44 are provided on the surface 16a of the second separator 16 around the outer peripheral portion of the second separator 16, for preventing leakage of the oxygen-containing gas. The bead seals 44 are formed to expand toward the frame member 24 by press forming. The bead seal 44 on the inner side is formed around the oxygen-containing gas flow field 36, the oxygen-containing gas supply passage 30a, and the oxygen-containing gas discharge passage 30b, while allowing the oxygen-containing gas flow field 36 to be connected to the oxygen-containing gas supply passage 30a and the oxygen-containing gas discharge passage 30b. Though the two bead seals 44 are provided in the embodiment, only one bead seal 44 may be provided.

A resin member 45 (or rubber member) is adhered to the front end surface of the ridge of the bead seal 44 by printing, coating, etc. The bead seals 44 contact the second frame shaped sheet 24b (an area overlapped with the first frame shaped sheet 24a) in an air tight or liquid tight manner through the resin member 45. The resin member 45 may be adhered to the second frame shaped sheet 24b.

Instead of the bead seals 44, elastic solid seals protruding toward the frame member 24 may be provided for the second separator 16.

For example, polyester fiber, silicone, EPDM, FKM, etc. are used for the resin members 43, 45. The resin members 43, 45 are not essential, and may not be provided (In this case, the bead seals 42 directly contact the first frame shaped sheet 24a, and the bead seals 44 directly contact the second frame shaped sheet 24b.).

The bead seals 42 and the bead seals 44 face each other through the frame member 24. The outer peripheral portion of the frame member 24 (an area where the first frame shaped sheet 24a and the second frame shaped sheet 24b are overlapped with each other) is held between the bead seals 42 of the first separator 14 and the bead seals 44 of the second separator 16. In the case where the above solid seals are provided for the first separator 14 and the second separator 16, the outer peripheral portion of the frame member 24 (area where the first frame shaped sheet 24a and the second frame shaped sheet 24b are overlapped with each other) is held between the solid seal of the first separator 14 and the solid seal of the second separator 16.

A channel 36a formed between the second separator 16 and the frame member 24 inside the bead seals 44 (MEA 10a side) is connected to the oxygen-containing gas flow field 36. Therefore, the oxygen-containing gas is supplied to the channel 36a.

Figure 3:
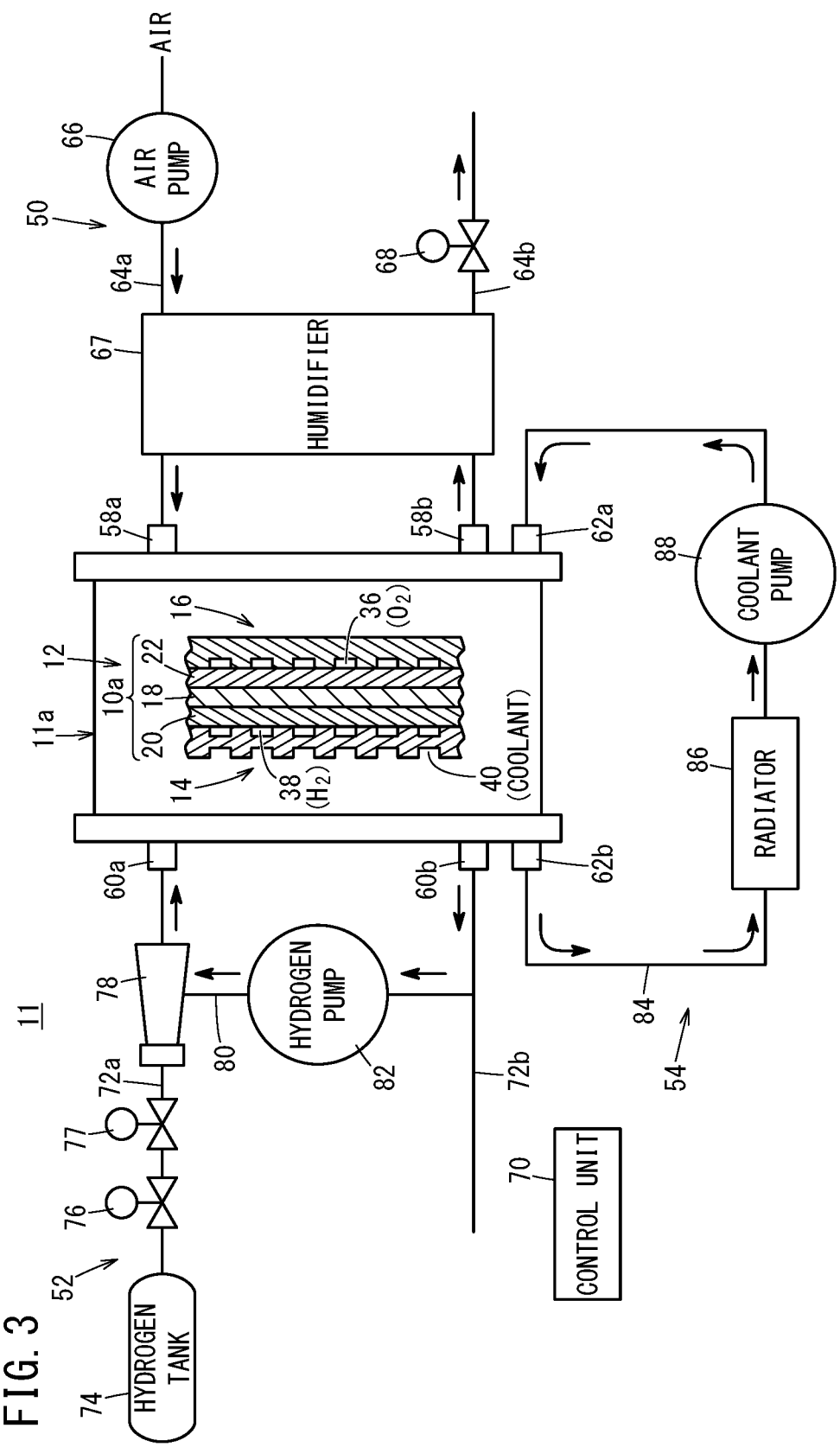
FIG. 3 is an overall schematic view showing a fuel cell system.

In FIG. 3, a fuel cell system 11 includes the above described fuel cell stack 11a, an oxygen-containing gas supply apparatus 50 for supplying the oxygen-containing gas to the fuel cell stack 11a, a fuel gas supply apparatus 52 for supplying the fuel gas to the fuel cell stack 11a, and a coolant supply apparatus 54 for supplying the coolant to the fuel cell stack 11a.

The oxygen-containing gas supply apparatus 50 includes an oxygen-containing gas supply pipe 64a connected to the oxygen-containing gas supply passage 30a (see FIG. 1) through an oxygen-containing gas supply manifold 58a provided for the fuel cell stack 11a, and an oxygen-containing gas discharge pipe 64b connected to the oxygen-containing gas discharge passage 30b (see FIG. 1) through an oxygen-containing gas discharge manifold 58b provided for the fuel cell stack 11a. An air pump 66 is provided for the oxygen-containing gas supply pipe 64a. A back pressure regulating valve 68 is provided in the oxygen-containing gas discharge pipe 64b.

A humidifier 67 is provided for the oxygen-containing gas supply pipe 64a and the oxygen-containing gas discharge pipe 64b. The structure of the humidifier 67 is not limited specially as long as the humidifier 67 can humidify the air to be supplied to the fuel cell stack 11a. In the oxygen-containing gas supply pipe 64a, the air pump 66 is provided upstream of the humidifier 67. In the oxygen-containing gas discharge pipe 64b, the back pressure regulating valve 68 is provided downstream of the humidifier 67. A control unit 70 of the fuel cell system 11 controls at least one of the operation speed of the air pump 66 and the valve opening degree of the back pressure regulating valve 68 to control the pressure and the flow rate of the oxygen-containing gas flowing through the oxygen-containing gas flow field 36.

The fuel gas supply apparatus 52 includes a fuel gas supply pipe 72a connected to the fuel gas supply passage 34a (see FIG. 1) through a fuel gas supply manifold 60a provided for the fuel cell stack 11a, and a fuel gas discharge pipe 72b connected to the fuel gas discharge passage 34b (see FIG. 1) through a fuel gas discharge manifold 60b provided for the fuel cell stack 11a.

A hydrogen tank 74 for storing high pressure hydrogen is provided upstream of the fuel gas supply pipe 72a. In the fuel gas supply pipe 72a, a stop valve 76, a regulating valve 77, and an ejector 78 are provided between the fuel gas supply manifold 60a and the hydrogen tank 74. A hydrogen circulation channel 80 is connected to the ejector 78 and the fuel gas discharge pipe 72b. A hydrogen pump 82 for hydrogen circulation is provided in the hydrogen circulation channel 80. The control unit 70 controls the speed of driving the hydrogen pump 82 to control the flow rate of the fuel gas flowing through the fuel gas flow field 38.

The coolant supply apparatus 54 includes a coolant circulation channel 84 for circulating, and supplying the coolant to the fuel cell stack 11a. The coolant circulation channel 84 is connected to the coolant supply passage 32a (see FIG. 1) through a coolant supply manifold 62a provided for the fuel cell stack 11a. The coolant circulation channel 84 is connected to the coolant discharge passage 32b (see FIG. 1) through a coolant discharge manifold 62b. A radiator 86 and a coolant pump 88 are provided for the coolant circulation channel 84.

Operation of the fuel cell system 11 including the power generation cell 12 (fuel cell stack 11a) having the above structure will be described below.

As shown in FIG. 3, in the oxygen-containing gas supply apparatus 50, the air is supplied to the oxygen-containing gas supply pipe 64a under operation of the air pump 66. After the air flows through the humidifier 67, and the air is humidified, the air is supplied to the oxygen-containing gas supply passage 30a (see FIG. 1) through the oxygen-containing gas supply manifold 58a. The humidifier 67 adds the water and the heat discharged from the oxygen-containing gas discharge manifold 58b to the air to be supplied. In the meanwhile, in the fuel gas supply apparatus 52, under operation of the stop valve 76, the fuel gas is supplied from the hydrogen tank 74 to the fuel gas supply pipe 72a. At this time, the fuel gas whose pressure is regulated (reduced) by the regulating valve 77 and the fuel gas from the hydrogen pump 82 are merged at the ejector 78, and the fuel gas is guided to the fuel gas supply manifold 60a. The fuel gas is supplied to the fuel gas supply passage 34a (see FIG. 1) through the fuel gas supply manifold 60a. Further, in the coolant supply apparatus 54, under operation of the coolant pump 88, the coolant is supplied from the coolant circulation channel 84 to the coolant supply passage 32a (see FIG. 1). At this time, the coolant is supplied from the coolant supply manifold 62a to the coolant flow field 40 provided in the fuel cell stack 11a. After the coolant flows through the coolant flow field 40, the coolant is discharged from the coolant discharge manifold 62b to the coolant circulation channel 84 outside the fuel cell stack 11a. Then, after the coolant is cooled by the radiator 86, the coolant is supplied again to the coolant supply manifold 62a by the coolant pump 88.

Thus, as shown in FIG. 1, an oxygen-containing gas is supplied to the oxygen-containing gas supply passage 30a, and a fuel gas such as a hydrogen gas is supplied to the fuel gas supply passage 34a. Further, a coolant such as pure water, ethylene glycol, or oil is supplied to the coolant supply passage 32a.

Therefore, the oxygen-containing gas flows from the oxygen-containing gas supply passage 30a to the oxygen-containing gas flow field 36 of the second separator 16, and moves in the direction indicated by the arrow B, and the oxygen-containing gas is supplied to the cathode 22 of the MEA 10a. In the meanwhile, the fuel gas flows from the fuel gas supply passage 34a to the fuel gas flow field 38 of the first separator 14. The fuel gas moves along the fuel gas flow field 38 in the direction indicated by the arrow B, and the fuel gas is supplied to the anode 20 of the MEA 10a.

Thus, in the MEA 10a, the oxygen-containing gas supplied to the cathode 22, and the fuel gas supplied to the anode 20 are partially consumed in the second electrode catalyst layer 22a and the first electrode catalyst layer 20a by electrochemical reactions to generate electrical energy.

In this case, the pressure of the first reactant gas (fuel gas) supplied to the fuel gas flow field 38 is higher than the pressure of the second reactant gas (oxygen-containing gas) supplied to the oxygen-containing gas flow field 36. In FIG. 2, the first reactant gas flows through the channel 38a formed between the first separator 14 and the frame member 24. Thus, the pressure of the first reactant gas is higher than the pressure of the second reactant gas. Therefore, the differential pressure P is applied to the frame member 24 provided between the channel 36a and the channel 38a, from the first frame shaped sheet 24a toward the second frame shaped sheet 24b (i.e., from the first separator 14 toward the second separator 16). Preferably, the differential pressure P is 5 to 300 kPa, and preferably, 10 to 200 kPa.

Then, in FIG. 1, the oxygen-containing gas supplied to, and partially consumed at the cathode 22 is discharged in the direction indicated by the arrow A along the oxygen-containing gas discharge passage 30b. Likewise, the fuel gas supplied to, and partially consumed at the anode 20 is discharged in the direction indicated by the arrow A along the fuel gas discharge passage 34b. The fuel gas flowing through the fuel gas discharge passage 34b is discharged from the fuel gas discharge manifold 60b.

Further, the coolant supplied to the coolant supply passage 32a flows into the coolant flow field 40 between the first separator 14 and the second separator 16, and then, the coolant flows in the direction indicated by the arrow B. After the coolant cools the MEA 10a, the coolant is discharged through the coolant discharge passage 32b.

The frame equipped MEA 10 and the power generation cell 12 according to the first embodiment offer the following advantages.

In the frame equipped MEA 10, the outer end of the larger electrode (cathode 22) is positioned outside the inner end of the frame shaped sheet having the larger inner periphery (second frame shaped sheet 24b), over the entire periphery. In the structure, a portion of the first frame shaped sheet 24a corresponding to a position between the outer end 20e of the anode 20 and the inner end 24be of the second frame shaped sheet 24b (portion of the first frame shaped sheet 24a which is not overlapped with the second frame shaped sheet 24b) is supported by the outer peripheral portion 22c of the cathode 22. Accordingly, it is possible to suppress deformation of the frame member 24 in the presence of the differential pressure applied from the anode, and improve the durability of the frame member 24.

In the power generation cell 12, the bead seals 42, 44 are formed integrally with each of the first separator 14 and the second separator 16. The bead seals 42, 44 protrude toward the frame member 24 for preventing leakage of the reactant gas. The bead seal 42 of the first separator 14 and the bead seal 44 of the second separator 16 hold a portion where the first frame shaped sheet 24a and the second frame shaped sheet 24b of the frame member 24 overlap, in the thickness direction from both sides. In the structure, the outer peripheral portion of the relatively thick frame member 24 is held between the bead seals 42, 44. Therefore, it is possible to obtain the suitable seal surface pressure. Further, since the inner peripheral portion of the relatively thin frame member 24 is positioned between the anode 20 and the cathode 22, it is possible to effectively suppress the thickness of the joint portion between the frame member 24 and the MEA 10a.

Second Embodiment

Figure 4:
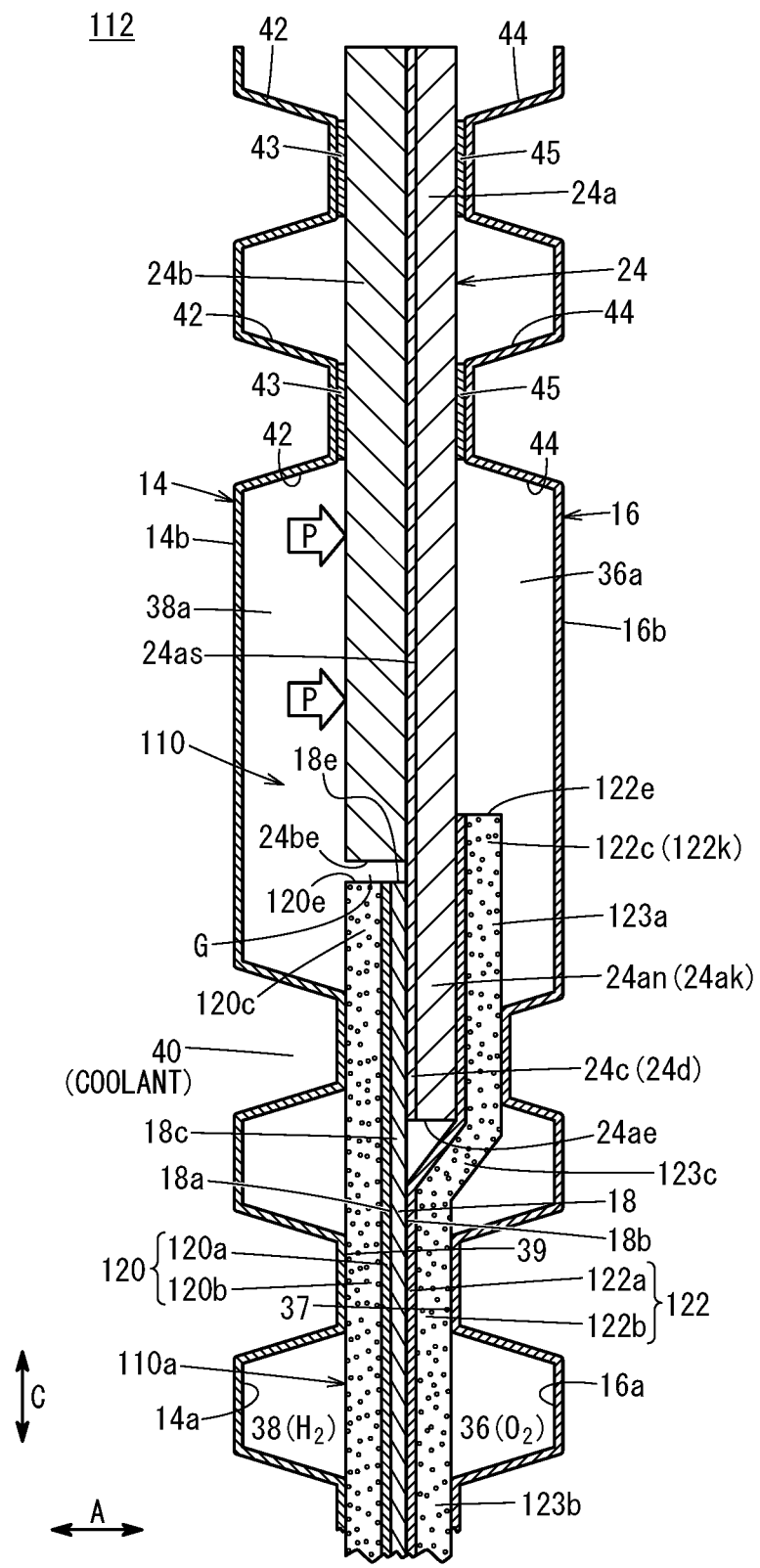
FIG. 4 is a cross sectional view showing a power generation cell according to a second embodiment of the present invention.

As shown in FIG. 4, a power generation cell (fuel cell) 112 according to a second embodiment includes a resin frame equipped membrane electrode assembly 110 (hereinafter referred to as the "frame equipped MEA 110") and a first separator 14 and a second separator 16 provided on both sides of the frame equipped MEA 110. In the following description, the constituent elements of the second embodiment which are not mentioned specially are assumed to have the same structure as the constituent elements of the first embodiment having the same names.

The frame equipped MEA 110 has a rectangular shape, and includes a membrane electrode assembly 110a (hereinafter referred to as the "MEA 110a") and a frame member 24 joined to an outer peripheral portion of the MEA 110a. The MEA 110a includes an electrolyte membrane 18, an anode 120 provided on one surface 18a of the electrolyte membrane 18, and a cathode 122 provided on another surface 18b of the electrolyte membrane 18. In the second embodiment, the anode 120 is the "first electrode", and the cathode 122 is the "second electrode" of the present invention. The outer end 18e of the electrolyte membrane 18 and an outer end 120e of the anode 120 are provided at the same position as viewed in the thickness direction of the MEA 110a.

The anode 120 includes a first electrode catalyst layer 120a joined to one surface 18a of the electrolyte membrane 18, and a first gas diffusion layer 120b stacked on the first electrode catalyst layer 120a. The anode 120 is in parallel with the electrolyte membrane 18 over the entire surface.

The cathode 122 includes a second electrode catalyst layer 122a joined to a surface 18b of the electrolyte membrane 18 and a second gas diffusion layer 122b stacked on the second electrode catalyst layer 122a. The surface size of the cathode 122 is larger than the surface sizes of the electrolyte membrane 18 and the anode 120. Therefore, an outer end 122e of the cathode 122 is positioned outside the outer end 120e of the anode 120 over the entire periphery.

A step is provided for the cathode 122 at a position corresponding to the inner end 24ae of the first frame shaped sheet 24a. Specifically, the cathode 122 has an inclined area 123c inclined from the electrolyte membrane 18, between an area 123a overlapped with the inner peripheral portion 24an of the first frame shaped sheet 24a and an area 123b overlapped with the outer peripheral portion 18c of the electrolyte membrane 18. In the cathode 122, the surface of the area 123a overlapped with the inner peripheral portion 24an of the first frame shaped sheet 24a, adjacent to the second separator 16 is spaced from the electrolyte membrane 18, in comparison with the surface of the area 123b overlapped with the electrolyte membrane 18, adjacent to the second separator 16.

The outer end 122e of the cathode 122 is provided outside the inner end 24be of the second frame shaped sheet 24b over the entire periphery. Therefore, an outer peripheral portion 122c of the cathode 122 includes an overlap part 122k overlapped with the inner peripheral portion of the second frame shaped sheet 24b over the entire periphery as viewed in the thickness direction of the MEA 110a.

In the second embodiment, the first frame shaped sheet 24a comprising a frame shaped sheet having the same thickness as the second frame shaped sheet 24b or the smaller thickness (having the smaller inner periphery) is provided adjacent to the cathode (second separator 16), and the second frame shaped sheet 24b comprising a frame shaped sheet having the larger thickness is provided adjacent to the anode (first separator 14). The inner peripheral portion 24an of the first frame shaped sheet 24a is positioned between an outer peripheral portion 120c of the anode 120 and the outer peripheral portion 122c of the cathode 122.

The first frame shaped sheet 24a and the second frame shaped sheet 24b are joined together over the entire periphery (over the entire surface of the second frame shaped sheet 24b adjacent to the first frame shaped sheet 24a) by an adhesive layer 24c. The inner peripheral portion 24an of the first frame shaped sheet 24a is joined to the surface of the outer peripheral portion 18c of the electrolyte membrane 18 adjacent to the cathode 122 by the adhesive layer 24c. The inner peripheral portion 24an of the first frame shaped sheet 24a is joined to the outer peripheral portion 18c of the electrolyte membrane 18 by the adhesive layer 24c.

The inner end 24be of the second frame shaped sheet 24b is positioned outside the outer end 120e of the anode 120 over the entire periphery. Therefore, a gap G is formed between the outer end 120e of the anode 120 and the inner end 24be of the second frame shaped sheet 24b over the entire periphery.

As described above, in the frame equipped MEA 110 and the power generation cell 112 according to the second embodiment, the outer end of the larger electrode (cathode 122) is positioned outside the inner end of the thinner frame shaped sheet (second frame shaped sheet 24b) over the entire periphery. In the structure, a portion of the first frame shaped sheet 24a corresponding to a position between the outer end 120e of the anode 120 and the inner end 24be of the second frame shaped sheet 24b (portion of the first frame shaped sheet 24a which is not overlapped with the second frame shaped sheet 24b) is supported by the outer peripheral portion 122c of the cathode 122. Accordingly, in the same manner as the first embodiment, also in the second embodiment, it is possible to suppress deformation of the frame member 24 in the presence of the differential pressure applied from the anode, and improve the durability of the frame member 24. Additionally, in the second embodiment, the structure that is identical to the structure of the first embodiment offers the same advantages as in the case of the first embodiment.

Third Embodiment

Figure 5:
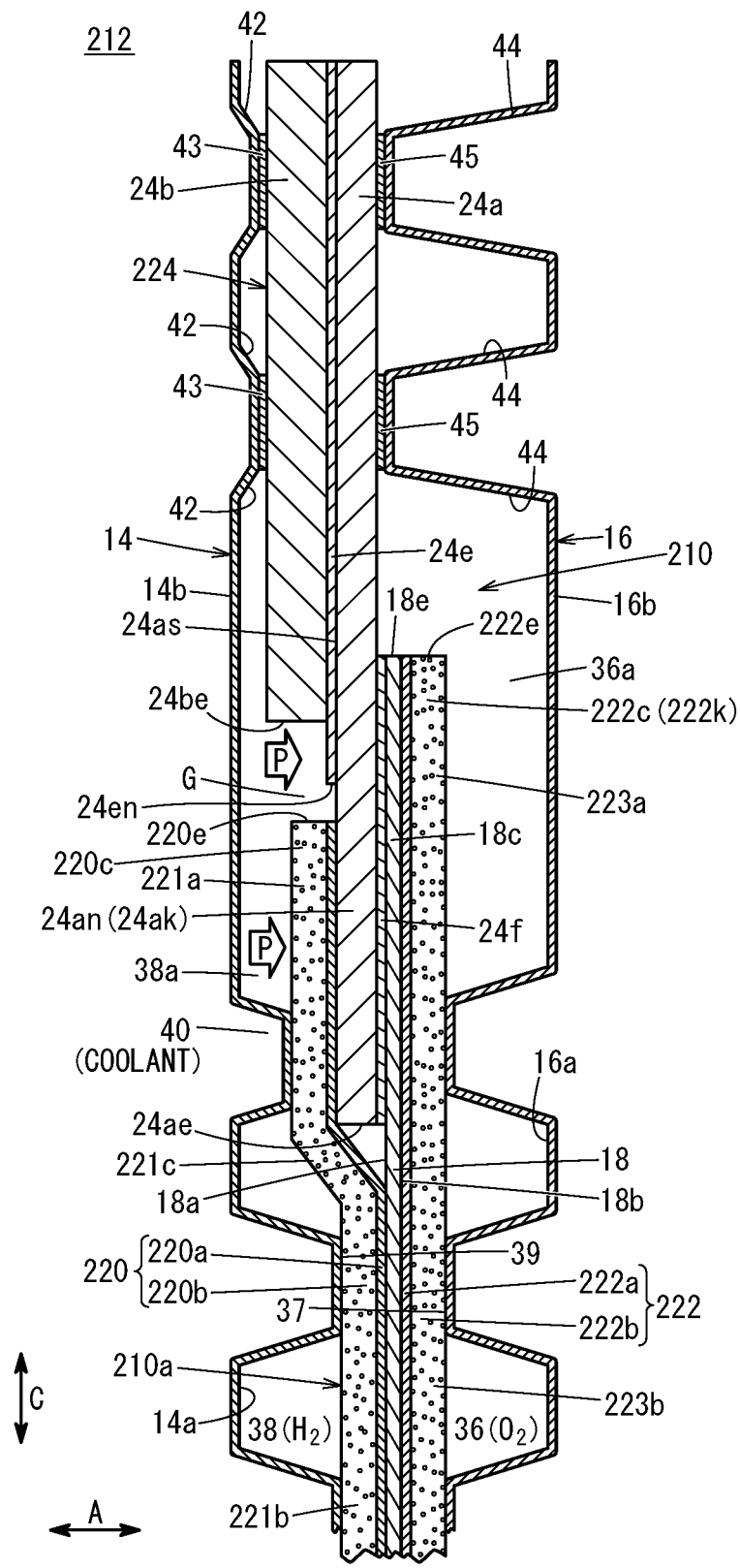
FIG. 5 is a cross sectional view showing a power generation cell according to a third embodiment of the present invention.

As shown in FIG. 5, a power generation cell (fuel cell) 212 according to a third embodiment includes a resin frame equipped membrane electrode assembly 210 (hereinafter referred to as the "frame equipped MEA 210") and a first separator 14 and a second separator 16 provided on both sides of the frame equipped MEA 210. In the following description, the constituent elements of the third embodiment which are not mentioned specially are assumed to have the same structure as the constituent elements of the first embodiment having the same names.

The frame equipped MEA 210 has a rectangular shape, and includes a membrane electrode assembly 210a (hereinafter referred to as the "MEA 210a") and a frame member 224 joined to an outer peripheral portion of the MEA 210a. The MEA 210a includes an electrolyte membrane 18, an anode 220 provided on one surface 18a of the electrolyte membrane 18, and a cathode 222 provided on another surface 18b of the electrolyte membrane 18. In the third embodiment, the anode 220 is the "first electrode", and the cathode 222 is the "second electrode". The outer end 18e of the electrolyte membrane 18 and an outer end 222e of the cathode 222 are provided at the same position as viewed in the thickness direction of the MEA 210a.

The anode 220 includes a first electrode catalyst layer 220a joined to one surface 18a of the electrolyte membrane 18, and a first gas diffusion layer 220b stacked on the first electrode catalyst layer 220a. A step is provided for the anode 220 at a position corresponding to the inner end 24ae of the first frame shaped sheet 24a. Specifically, the anode 220 has an inclined area 221c inclined from the electrolyte membrane 18, between an area 221a overlapped with the inner peripheral portion 24an of the first frame shaped sheet 24a and an area 221b overlapped with the electrolyte membrane 18. Therefore, in the inclined area 221c, the first electrode catalyst layer 220a and the first gas diffusion layer 220b are inclined from the electrolyte membrane 18.

In the anode 220, the surface of the area 221a overlapped with the inner peripheral portion 24an of the first frame shaped sheet 24a, adjacent to the first separator 14 is spaced from the electrolyte membrane 18, in comparison with the surface of the area 221b overlapped with the electrolyte membrane 18, adjacent to the first separator 14.

The cathode 222 includes a second electrode catalyst layer 222a joined to the other surface 18b of the electrolyte membrane 18, and a second gas diffusion layer 222b stacked on the second electrode catalyst layer 222a. The surface size of the cathode 222 is larger than the surface size of the anode 220. Therefore, the outer end 222e of the cathode 222 is positioned outside an outer end 220e of the anode 220 over the entire periphery. The surface size of the electrolyte membrane 18 and the surface size of the cathode 222 are the same.

The cathode 222 has a flat shape from an area 223a overlapped with the inner peripheral portion 24an of the first frame shaped sheet 24a to the inside of the electrolyte membrane 18.

The outer end 222e of the cathode 222 is positioned outside the inner end 24be of the second frame shaped sheet 24b over the entire periphery. Therefore, an outer peripheral portion 222c of the cathode 222 has an overlap part 222k overlapped with the inner peripheral portion of the second frame shaped sheet 24b over the entire periphery as viewed in the thickness direction of the MEA 210a.

In the third embodiment, the first frame shaped sheet 24a comprising a frame shaped sheet having the same thickness as the second frame shaped sheet 24b or the smaller thickness (having the smaller inner periphery) is provided adjacent to the cathode (second separator 16), and the second frame shaped sheet 24b comprising a frame shaped sheet having the larger thickness is provided adjacent to the anode (first separator 14). The inner peripheral portion 24an of the first frame shaped sheet 24a is positioned between an outer peripheral portion 220c of the anode 220 and the outer peripheral portion 222c of the cathode 222.

The first frame shaped sheet 24a and the second frame shaped sheet 24b are joined together over the entire periphery by a first adhesive layer 24e. Specifically, the outer peripheral portion of the first frame shaped sheet 24a is joined to the one entire surface of the second frame shaped sheet 24b by the first adhesive layer 24e provided on one surface of the first frame shaped sheet 24a. The first adhesive layer 24e is provided in the frame shape around the outer peripheral portion of one surface of the first frame shaped sheet 24a. An inner end 24en of the first adhesive layer 24e is positioned outside the outer end 220e of the anode 220, and inside the inner end 24be of the second frame shaped sheet 24b.

The inner peripheral portion 24an of the first frame shaped sheet 24a is joined to the surface 18a of the outer peripheral portion 18c of the electrolyte membrane 18 adjacent to the anode 220 by a second adhesive layer 24f. The inner peripheral portion 24an of the first frame shaped sheet 24a is joined to the surface of the outer peripheral portion 18c of the electrolyte membrane 18 adjacent to the anode 220 by the second adhesive layer 24f provided on the other surface of the first frame shaped sheet 24a (surface opposite to the second frame shaped sheet 24b).

The inner end 24be of the second frame shaped sheet 24b is positioned outside the outer end 220e of the anode 220 over the entire periphery. Therefore, a gap G is formed between the outer end 220e of the anode 220 and the inner end 24be of the second frame shaped sheet 24b over the entire periphery.

As described above, in the frame equipped MEA 210 and the power generation cell 212 according to the third embodiment, the outer end of the larger electrode (cathode 222) is positioned outside the inner end 24be of the thinner frame shaped sheet (second frame shaped sheet 24b) over the entire periphery. In the structure, a portion of the first frame shaped sheet 24a corresponding to a position between the outer end 220e of the anode 220 and the inner end 24be of the second frame shaped sheet 24b (portion of the first frame shaped sheet 24a which is not overlapped with the second frame shaped sheet 24b) is supported by the outer peripheral portion 222c of the cathode 222. Accordingly, in the same manner as the first embodiment, also in the third embodiment, it is possible to suppress deformation of the frame member 224 in the presence of the differential pressure of the reactant gas applied from the anode, and improve the durability of the frame member 224. Additionally, in the third embodiment, the structure that is identical to the structure of the first embodiment offers the same advantages as in the case of the first embodiment.

The present invention is not limited to the above embodiments. Various modifications can be made without departing from the gist of the present invention.

What is claimed is:

1. A frame equipped membrane electrode assembly comprising:
    a membrane electrode assembly including an electrolyte membrane, a first electrode provided on one surface of the electrolyte membrane, and a second electrode provided on another surface of the electrolyte membrane; and
    a frame member provided over an entire periphery of an outer peripheral portion of the membrane electrode assembly,
    wherein:
    a surface size of the second electrode is larger than a surface size of the first electrode;
    the frame member includes a first frame shaped sheet and a second frame shaped sheet;
    an inner peripheral portion of the first frame shaped sheet is joined to the outer peripheral portion of the membrane electrode assembly;
    the first frame shaped sheet and the second frame shaped sheet are joined together in a thickness direction;
    the inner peripheral portion of the first frame shaped sheet is disposed between an outer peripheral portion of the first electrode and an outer peripheral portion of the second electrode in the thickness direction;
    an inner peripheral portion of the second frame shaped sheet is joined to the first frame shaped sheet by an adhesive layer;
    an inner end of the second frame shaped sheet is positioned outside an outer end of the first electrode over an entire periphery of the second frame shaped sheet; and
    an outer end of the second electrode is positioned outside the inner end of the second frame shaped sheet over an entire periphery of the second electrode.

2. The frame equipped membrane electrode assembly according to claim 1, wherein the inner peripheral portion of the first frame shaped sheet is joined to a surface of an outer peripheral portion of the electrolyte membrane adjacent to the first electrode.

3. The frame equipped membrane electrode assembly according to claim 2, wherein an outer end of the electrolyte membrane is positioned outside the outer end of the first electrode.

4. The frame equipped membrane electrode assembly according to claim 2, wherein:
    the adhesive layer is provided on one entire surface of the first frame shaped sheet;
    an outer peripheral portion of the first frame shaped sheet is joined to one entire surface of the second frame shaped sheet by the adhesive layer; and the inner peripheral portion of the first frame shaped sheet is joined to the outer peripheral portion of the electrolyte membrane by the adhesive layer.

5. The frame equipped membrane electrode assembly according to claim 2, wherein the outer peripheral portion of the second electrode covers a step formed by one surface of the first frame shaped sheet and the inner end of the second frame shaped sheet, and extends outward beyond the inner end of the second frame shaped sheet.

6. The frame equipped membrane electrode assembly according to claim 2, wherein the first electrode includes a step at a position corresponding to an inner end of the first frame shaped sheet; and
the second electrode includes a step at a position corresponding to the inner end of the second frame shaped sheet.

7. The frame equipped membrane electrode assembly according to claim 2, wherein the first electrode is an anode; and the second electrode is a cathode.

8. The frame equipped membrane electrode assembly according to claim 1, wherein the inner peripheral portion of the first frame shaped sheet is joined to a surface of an outer peripheral portion of the electrolyte membrane adjacent to the second electrode.

9. The frame equipped membrane electrode assembly according to claim 8, wherein an outer end of the electrolyte membrane and the outer end of the first electrode are provided at a same position as viewed in a thickness direction of the membrane electrode assembly.

10. The frame equipped membrane electrode assembly according to claim 8, wherein:
the adhesive layer is provided on one entire surface of the first frame shaped sheet;
an outer peripheral portion of the first frame shaped sheet is joined to one entire surface of the second frame shaped sheet by the adhesive layer;
the inner peripheral portion of the first frame shaped sheet is joined to the outer peripheral portion of the electrolyte membrane by the adhesive layer.

11. The frame equipped membrane electrode assembly according to claim 8, wherein a gap is formed between the outer end of the first electrode and the inner end of the second frame shaped sheet.

12. The frame equipped membrane electrode assembly according to claim 8, wherein the first electrode is an anode; and the second electrode is a cathode.

13. The frame equipped membrane electrode assembly according to claim 1, wherein the inner peripheral portion of the first frame shaped sheet is joined to a surface of an outer peripheral portion of the electrolyte membrane adjacent to the first electrode, on a surface opposite to the second frame shaped sheet.

14. The frame equipped membrane electrode assembly according to claim 13, wherein an outer end of the electrolyte membrane and the outer end of the second electrode are at a same position as viewed in a thickness direction of the membrane electrode assembly.

15. The frame equipped membrane electrode assembly according to claim 13, wherein an outer peripheral portion of the first frame shaped sheet is joined to one entire surface of the second frame shaped sheet by a first adhesive layer provided on one surface of the first frame shaped sheet; and
the inner peripheral portion of the first frame shaped sheet is joined to the outer peripheral portion of the electrolyte membrane by a second adhesive layer provided on another surface of the first frame shaped sheet.

16. The frame equipped membrane electrode assembly according to claim 13, wherein a gap is formed between the outer end of the first electrode and the inner end of the second frame shaped sheet over the entire periphery.

17. The frame equipped membrane electrode assembly according to claim 13, wherein the first electrode is an anode; and the second electrode is a cathode.

18. The frame equipped membrane electrode assembly according to claim 13, wherein the first electrode is a cathode; and the second electrode is an anode.

19. The frame equipped membrane electrode assembly according to claim 1, wherein a thickness of the second frame shaped sheet and a thickness of the first frame shaped sheet are same.

20. The frame equipped membrane electrode assembly according to claim 1, wherein the second frame shaped sheet is thicker than the first frame shaped sheet.

21. A fuel cell comprising:
a frame equipped membrane electrode assembly; and
separators provided on both sides of the frame equipped membrane electrode assembly, respectively,
the frame equipped membrane electrode assembly comprising:
a membrane electrode assembly including an electrolyte membrane, a first electrode provided on one surface of the electrolyte membrane, and a second electrode provided on another surface of the electrolyte membrane; and
a frame member provided over an entire periphery of an outer peripheral portion of the membrane electrode assembly,
wherein:
a surface size of the second electrode is larger than a surface size of the first electrode;
the frame member includes a first frame shaped sheet and a second frame shaped sheet;
an inner peripheral portion of the first frame shaped sheet is joined to the outer peripheral portion of the membrane electrode assembly;
the first frame shaped sheet and the second frame shaped sheet are joined together in a thickness direction;
the inner peripheral portion of the first frame shaped sheet is disposed between an outer peripheral portion of the first electrode and an outer peripheral portion of the second electrode in the thickness direction;
an inner peripheral portion of the second frame shaped sheet is joined to the first frame shaped sheet by an adhesive layer;
an inner end of the second frame shaped sheet is positioned outside an outer end of the first electrode and an inner end of the first frame shaped sheet over an entire periphery of the second frame shaped sheet; and
an outer end of the second electrode is positioned outside the inner end of the second frame shaped sheet over an entire periphery of the second electrode.

22. The fuel cell according to claim 21, wherein a bead seal is formed integrally with each of the separators to protrude toward the frame member in order to prevent leakage of a reactant gas; and
an overlap area of the frame member where the first frame shaped sheet and the second frame shaped sheet are overlapped together is held between the bead seal of one of the separators and the bead seal of another of the separators from both sides in a thickness direction.

23. The fuel cell according to claim 21, wherein an overlap part where the outer peripheral portion of the first electrode, the inner peripheral portion of the first frame shaped sheet, and the outer peripheral portion of the second electrode are overlapped together is held between a ridge provided in one of the separators and protruding toward the first electrode and a ridge provided in another of the separators and protruding toward the second electrode.

24. A fuel cell comprising:
a frame equipped membrane electrode assembly; and
first and second separators, with one of the separators provided on each side of the frame equipped membrane electrode assembly,
the frame equipped membrane electrode assembly comprising:
a membrane electrode assembly including an electrolyte membrane, a first electrode provided on one surface of the electrolyte membrane, and a second electrode provided on another surface of the electrolyte membrane; and
a frame member entirely disposed between the separators in a thickness direction of the fuel cell, the frame member extending around an entire outer periphery of the membrane electrode assembly,
wherein:
a surface size of the second electrode is larger than a surface size of the first electrode;
the frame member includes a first frame shaped sheet and a second frame shaped sheet;
an inner peripheral portion of the first frame shaped sheet is joined to the outer peripheral portion of the membrane electrode assembly;
the first frame shaped sheet and the second frame shaped sheet are joined together in the thickness direction;
the inner peripheral portion of the first frame shaped sheet is disposed between an outer peripheral portion of the first electrode and an outer peripheral portion of the second electrode in the thickness direction;
an inner peripheral portion of the second frame shaped sheet is joined to the first frame shaped sheet by an adhesive layer;
an inner end of the second frame shaped sheet is positioned outside an outer end of the first electrode and an inner end of the first frame shaped sheet over an entire periphery of the membrane electrode assembly; and
an outer end of the second electrode is positioned outside the inner end of the second frame shaped sheet over an entire periphery of the second electrode.

* * * * *